Sept. 30, 1969

D. E. OWEN 3,469,962

METHOD AND APPARATUS FOR SURFACE
LEVEL CONTROL OF MOLTEN GLASS

Filed Nov. 17, 1965

Inventor
David Edward Owen
By
Morrison, Kennedy & Campbell
Attorneys

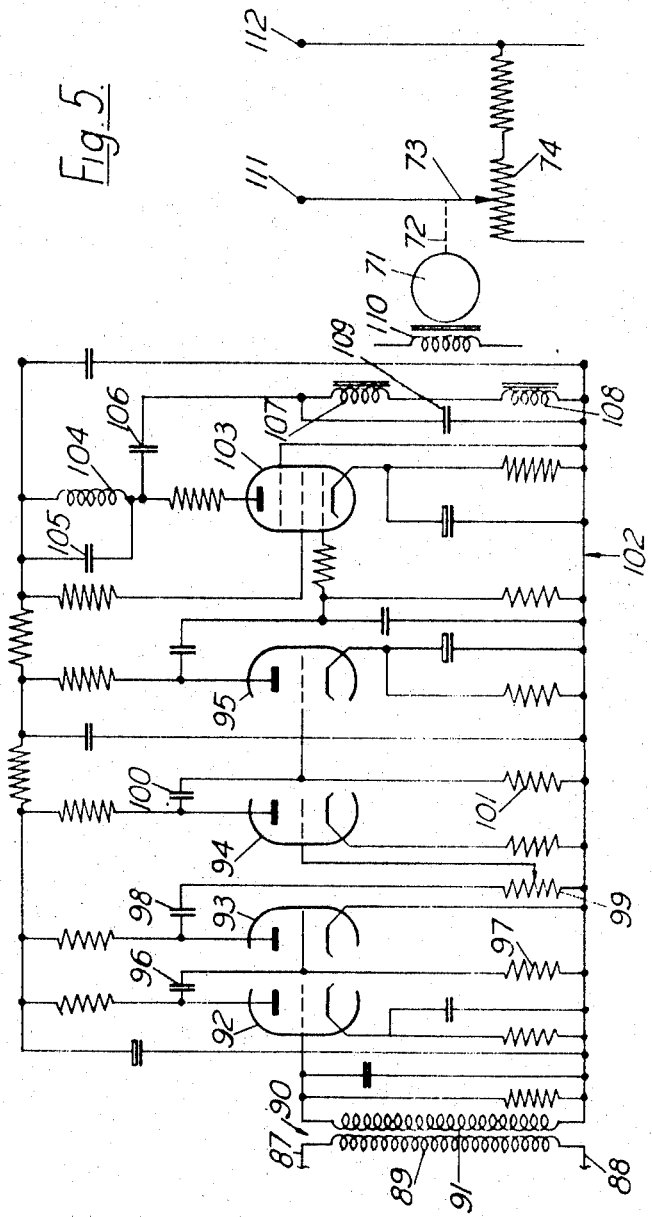

Sept. 30, 1969   D. E. OWEN   3,469,962
METHOD AND APPARATUS FOR SURFACE
LEVEL CONTROL OF MOLTEN GLASS
Filed Nov. 17, 1965   6 Sheets-Sheet 5
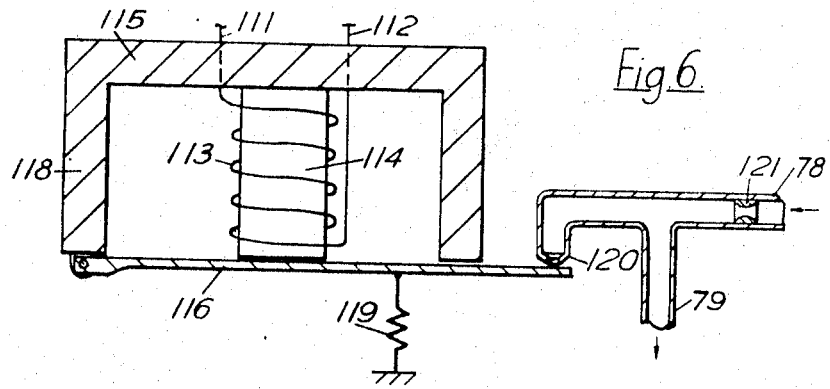
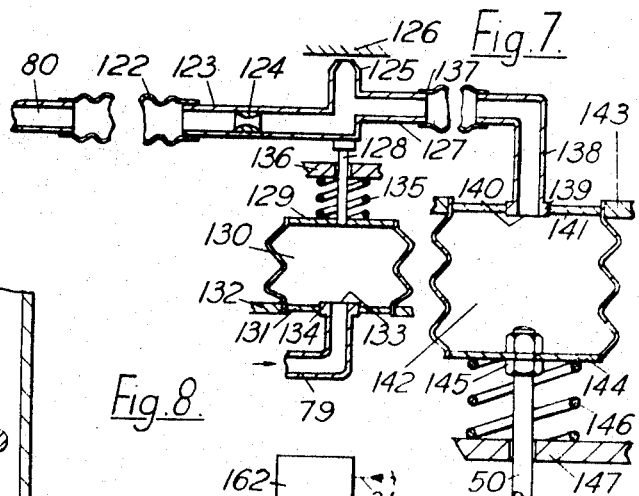
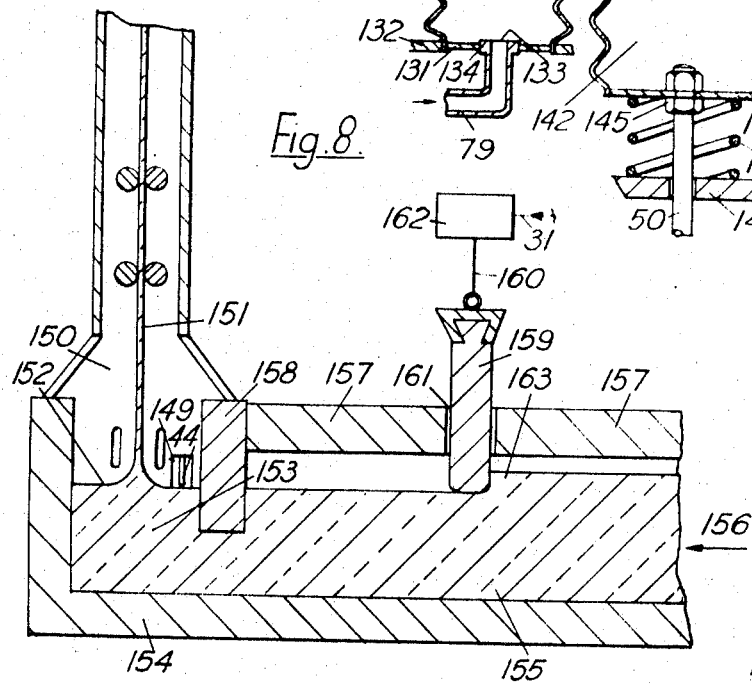
Inventor
David Edward Owen
By
Morrison, Kennedy & Campbell
Attorneys

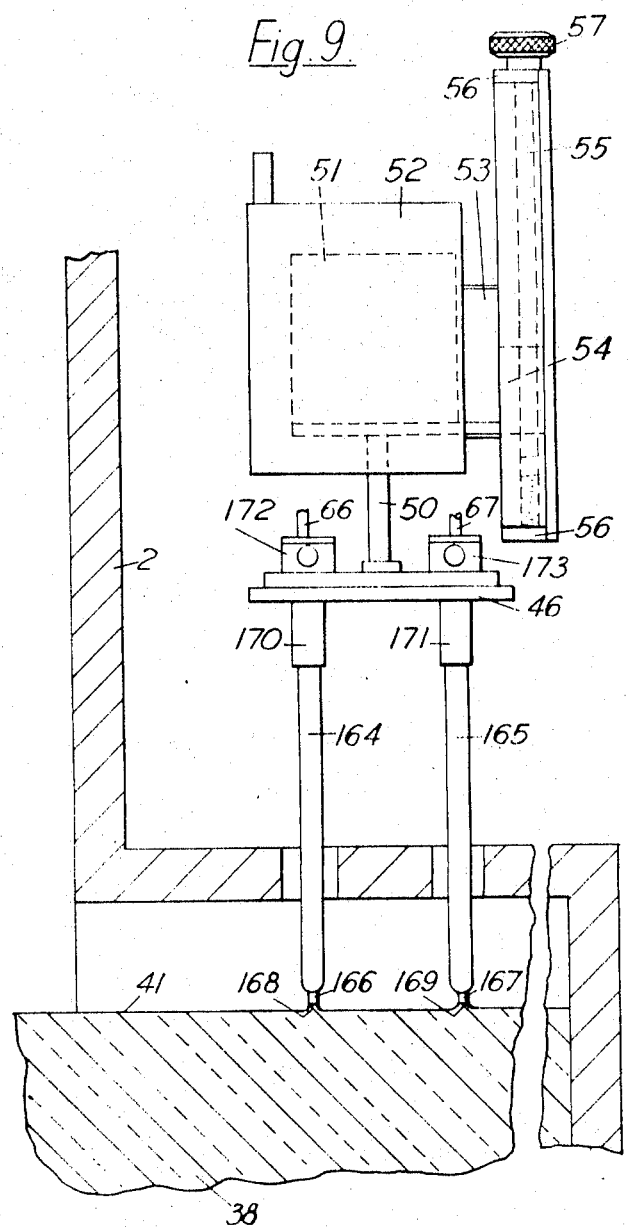

United States Patent Office 3,469,962
Patented Sept. 30, 1969

3,469,962
METHOD AND APPARATUS FOR SURFACE LEVEL CONTROL OF MOLTEN GLASS
David Edward Owen, Billinge, Wigan, England, assignor to Pilkington Brothers Limited, Liverpool, Lancashire, England
Filed Nov. 17, 1965, Ser. No. 508,344
Claims priority, application Great Britain, Dec. 18, 1964, 51,614/64
Int. Cl. C03b 15/04
U.S. Cl. 65—29                10 Claims

ABSTRACT OF THE DISCLOSURE

The surface level of a body of molten glass is continuously indicated by drawing a bead of glass from the surface, and maintaining that bead unbroken while its electrical resistance is continuously monitored and the bead is returned to its optimum height if a resistance change takes place.

Figure 1:
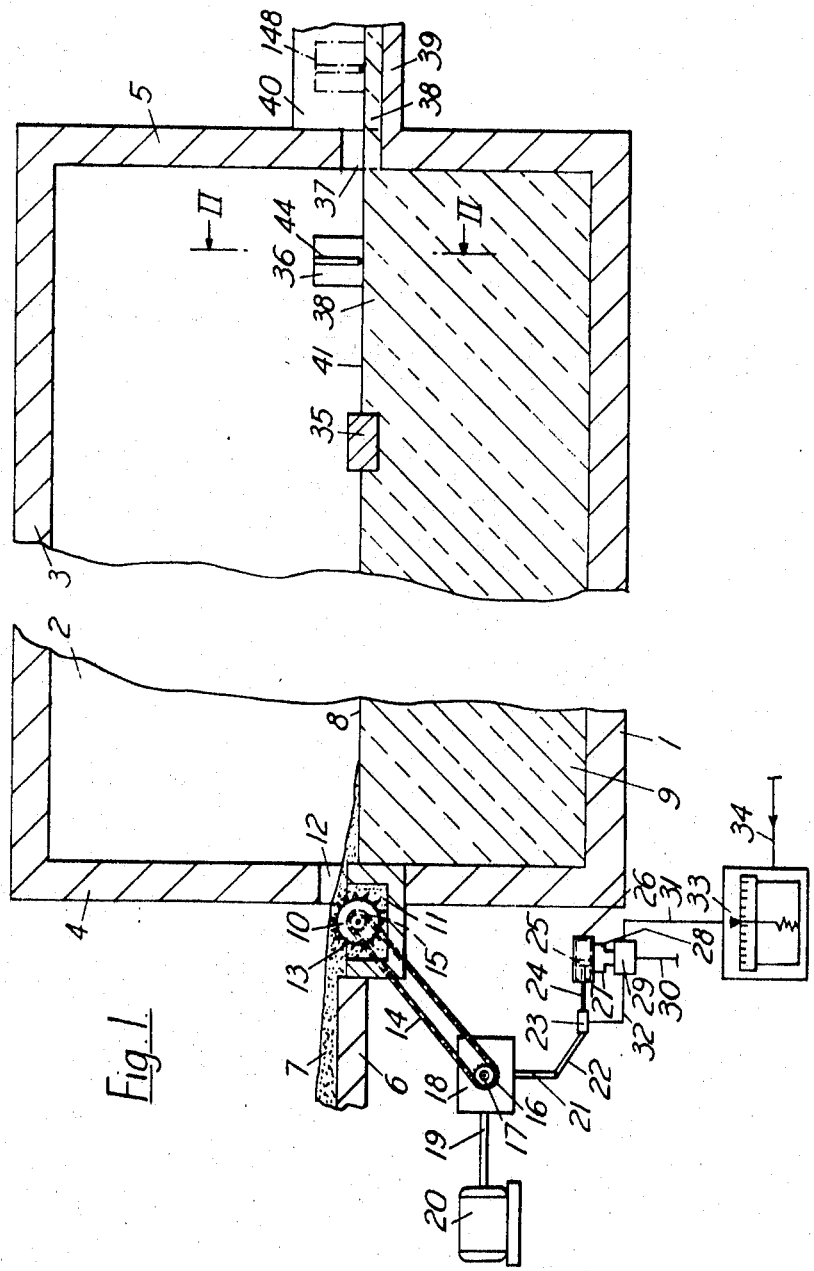

This invention relates to glass manufacturing processes and apparatus, and more especially to processes and appartus in which it is desirble to obtain a continuous indication of the surface level of a body of molten glass.

It is a main object of the present invention to provide an improved continuous indication of the surface level of a body of molten glass.

Yet another object of the invention is to provide control of a glass manufacturing process in response to indications of changes in the surface level of a body of molten glass.

According to the invention there is provided in a glass manufacturing process the steps of continuously indicating the surface level of a body of molten glass by drawing a bead of glass from the surface of the molten glass, measuring the resistance of an electrical circuit including that bead, detecting any change in resistance of the circuit from an optimum resistance value corresponding to an optimum height of the bead, producing a signal indicative of that change of resistance, employing the signal to return the height of the drawn bead of molten glass to said optimum height, and monitoring said signal to obtain a continuous indication of the surface level of the molten glass.

The signal may be monitored to obtain a continuous record of changes in the surface level of the molten glass, and the signal may also be employed in the control of an earlier stage in the glass manufacturing process so that the surface level of the body of molten glass is maintained constant.

From this aspect the invention provides in a glass manufacturing process, continuously controlling the surface level of a body of molten glass by drawing a bead of glass from the surface of the body of molten glass, measuring the resistance of an electrical circuit including that bead, detecting any change in the resistance of the circuit from an optimum resistance value corresponding to an optimum height of the bead due to a change in the dimensions of the bead as the surface level changes from a datum level, producing a signal indicative of the change in surface level from the datum level and employing that signal to control the rate of feed of glass to the body of molten glass so as to maintain the surface level of the body of molten glass constant.

For example in a glass melting furnace it is desirable to obtain a continuous indication of the surface level of the molten glass at the outlet end of the furnace in order that action can be taken to adjust the feed of glass forming batch materials to the furnace and so maintain the surface level of the molten glass constant, or substantially so. This would ensure a constant head of molten glass at each forehearth over which molten glass is withdrawn from the furnace.

Accordingly the invention also provides in a glass manufacturing process, continuously controlling the surface level of a body of molten glass in a glass melting furnace by drawing a bead of glass from the surface of the body of molten glass, measuring the resistance of an electrical circuit including that bead, detecting any change in the resistance of the circuit from an optimum resistance value corresponding to an optimum height of the bead due to a change in dimensions of the bead as the surface level changes, producing a signal indicative of that change of resistance, employing that signal to return the height of the drawn bead to said optimum height and employing an indication of the position of the drawn bead relative to a datum position to control the rate of feed of glass-forming materials to the furnace so as to maintain the surface of the body of molten glass at a datum level.

In addition in vertical drawing processes for the manufacture of sheet glass a body of molten glass is maintained in a drawing pot by continuous flow of molten glass along a canal connected to a forehearth of a glass melting furnace, and it is desirable to keep a continuous watch on the surface level of the molten glass in the drawing pot and/or in the canal, and thereafter to regulate the rate of flow of molten glass to the drawing pot so that the level of the molten glass surface, from which a sheet of glass is continuously drawn vertically, remains steady.

In a preferred method of operating the invention a single bead of molten glass is drawn from the surface of the body of molten glass on the end of a probe, and the electrical circuit extends from the probe, through the bead and through molten glass adjacent the drawn bead to an electrode fixed in the body of molten glass.

In another embodiment of the invention two beads of glass are drawn from the surface of the molten glass and the resistance of the circuit including the two beads and the intervening glass is measured.

A preferred method of operating the invention comprises producing an electrical error signal indicative of a change in resistance of said electrical circuit, converting said electrical error signal into a pneumatic signal, and employing the pneumatic signal to return the height of the ead or beads of molten glass to the optimum height.

Further the invention provides a method wherein the pressure in the pneumatic circuit through which said pneumatic signal is transmitted is indicative of the level of the surface of the glass relative to a datum level and said pressure is employed to control the rate of feed of glass to said body of molten glass so as to return the surface level to the datum level.

The invention also comprehends apparatus for continuously indicating the surface level of a body of molten glass, comprising an electrical probe for drawing a bead of molten glass from the surface of said body of molten glass, positioning means connected to the probe and operable to move the probe towards and away from the surface of the molten glass, an electrical detection circuit connected to the probe and to the body of molten glass and operable to detect any change in the resistance of an electrical circuit including said drawn bead of molten glass and to produce an error signal indicative of that resistance change, signal transmitting means connecting the detection circuit to the positioning means which is operable on receipt of an error signal to move the probe so as to return the drawn bead to an optimum height, and monitoring means connected to the signal transmitting means to monitor a continuous indication of the surface level of the molten glass.

Preferably the electrical detection circuit includes an A.C. bridge a change in whose output indicates a change in level of the surface of the molten glass.

In a preferred embodiment of the invention one arm of the bridge is connected to said electrical probe and to a fixed electrode dipping into the body of molten glass, whereby the resistance of that bridge arm is the resistance of the bead of molten glass drawn on the probe and the molten glass between the drawn bead and the fixed electrode.

In another apparatus according to the invention there are two probes of equal length mounted side-by-side on a cross-piece connected to said positioning means, the two probes being connected to one arm of the bridge so that the resistance of that bridge arm is the series resistance of two beads of molten glass drawn on the ends of the probes and of the molten glass between the beads.

Further according to the invention the output from the bridge is connected through an amplifier to a servomotor connected to a wiper on a potentiometer connected across a D.C. supply, whereby a change in the output from the bridge indicating a change in level of the surface of the molten glass is transformed into an error signal which appears as a change in the direct current flowing in the output circuit of the potentiometer.

This electrical error signal may be employed for controlling the positioning means, but in the preferred embodiment of the invention the signal transmitting means includes a current to pressure convertor whose input is connected to the output circuit of the potentiometer, and whose output is connected by a pressure line to the positioning means, said convertor being operable to convert the direct current flowing in the output circuit of the potentiometer into a corresponding pressure on the pressure line for transmission to the positioning means, whereby said error signal appears as a change in pressure on the pressure line which causes the positioning means to return the probes to the optimum height above the surface of the molten glass and thereby eliminate the error signal.

In order to produce a continuous record of the surface level of the molten glass a pneumatically-operated graphic recorder may be connected to the pressure line, being responsive to the pressure on the pressure line to produce said record.

The invention also comprehends glass-making apparatus including apparatus as set out above for indicating the surface level of a body of molten glass, a comparator device for continuously comparing the output signal from the signal transmitting means with a datum signal indicating a datum level of the surface of the body of molten glass, which comparator device is operable to produce a difference signal indicating a fluctuation of the actual level of the glass from that datum level, means for regulating the rate of feed of glass to the body of molten glass, which regulating means is connected to said comparator device and is operably by said difference signal to vary the rate of glass feed in order to correct said fluctuation thereby maintaining the surface level of the body of molten glass at said datum level.

One application of the invention is to the maintenance of a constant surface level of the body of molten glass in a glass melting furnace, in particular at the outlet end of the furnace, or in the canal through which glass flows from the melting zone to the fining zone.

From this aspect the invention also comprehends a glass melting furnace including apparatus as set out above for indicating the surface level of molten glass at an outlet from the furnace, means for feeding glass forming materials to the furnace, controllable driving means for said feeding means operable to regulate the rate of feed of said glass forming materials, said driving means being connected to the comparator device and being controlled by said difference signal to regulate the rate of feed of glass forming materials into the furnace so that the surface level of the molten glass at said outlet from the furnace remains constant.

The invention may also be employed for continuously indicating the surface level of the body of molten glass contained in a drawing pot, from which surface a sheet of glass is vertically drawn. Accordingly the invention also provides apparatus for vertically drawing glass in sheet form from the surface of a body of molten glass contained in a drawing pot, said apparatus including glass level indicating apparatus as set out above and means for regulating the rate of flow of molten glass to said drawing pot under control of a difference signal, which glass flow regulating means is connected to the comparator device and is operable to vary the rate of feed of molten glass to the pot thereby to maintain the surface level of the molten glass in the pot constant or substantially so.

Figure 2:
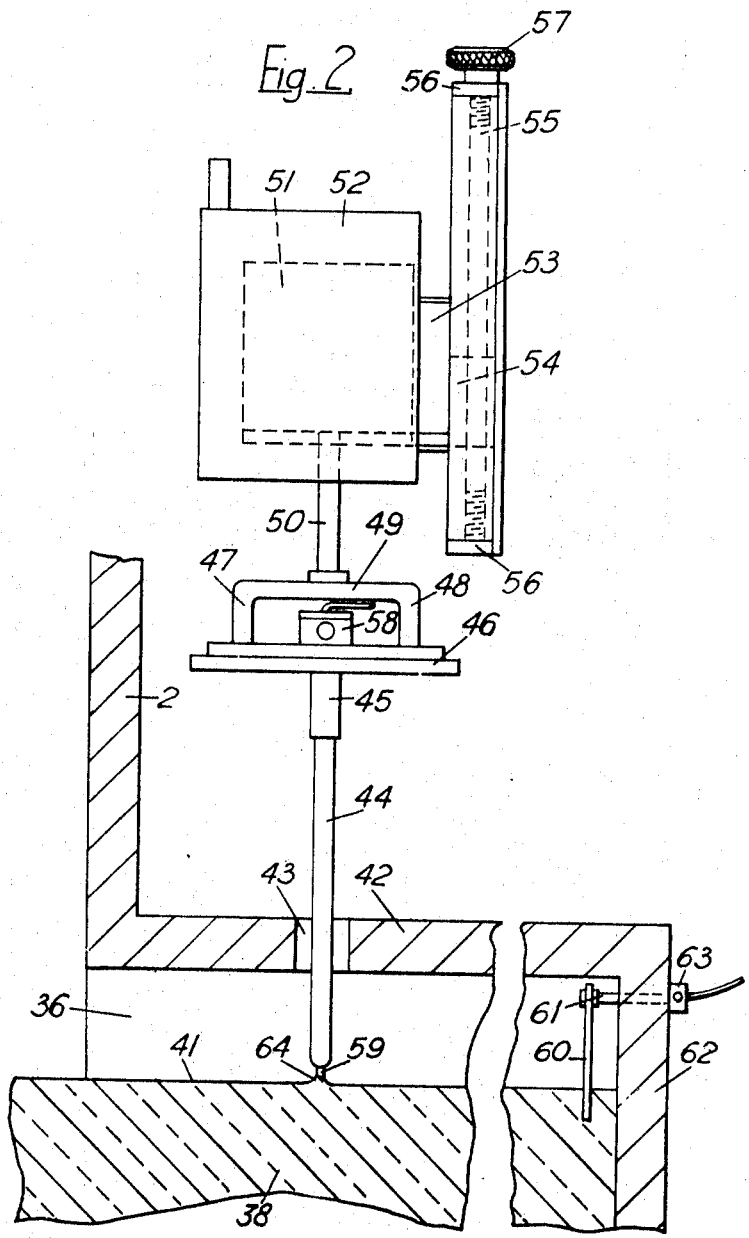
Figure 3:
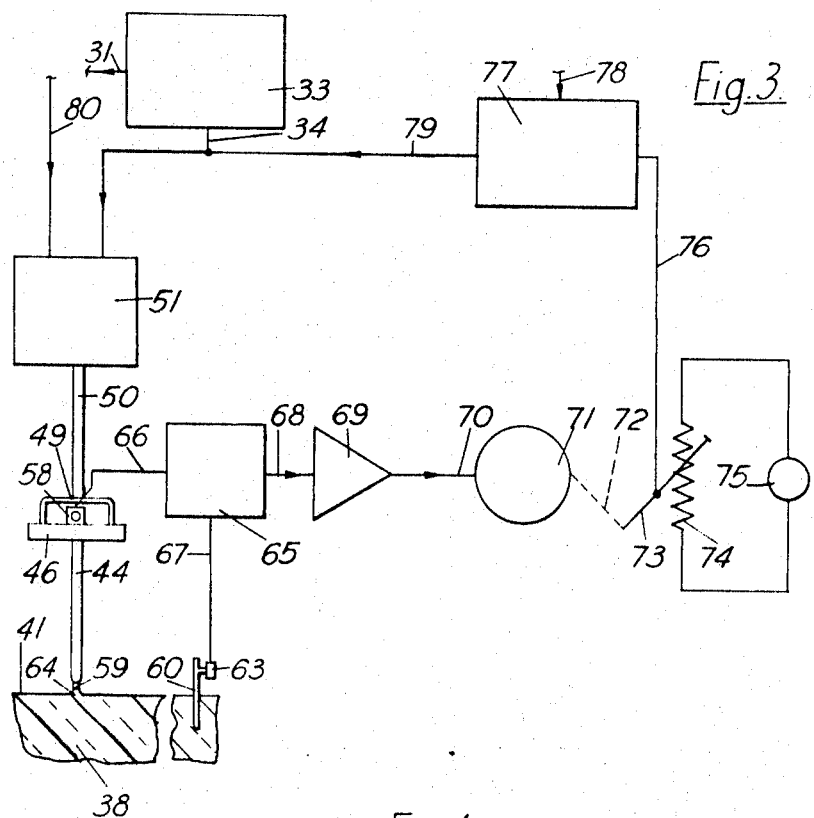
Figure 4:
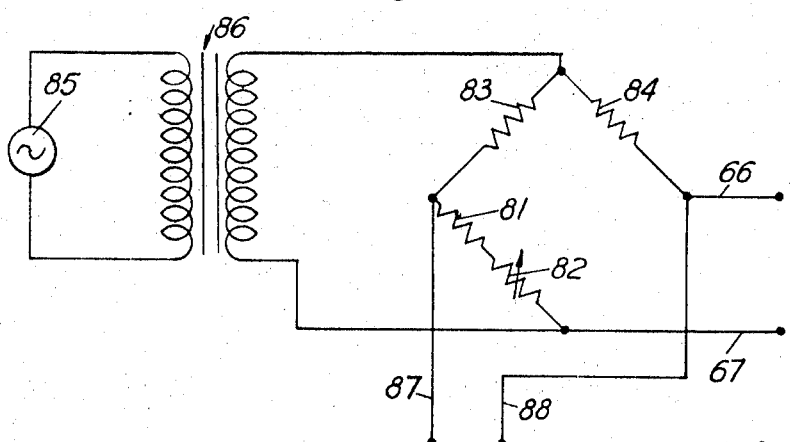

In order that the invention may be more clearly understood some embodiments thereof will now be described, by way of example, with reference to the accompanying drawings in which:

FIG. 1 is a sectional elevation through a glass melting furnace of well-known kind, shown diagrammatically, and indicating the position of glass level indicating apparatus according to the invention, and means for controlling the rate of feed of glass-forming materials to the melting furnace, FIG. 2 is a section on line II—II of FIG. 1, which shows an embodiment of the invention employing a single electrical probe, FIG. 3 is a schematic electrical and pneumatic circuit diagram illustrating the control of the glass level indicating apparatus, FIG. 4 is a circuit diagram of an A.C. bridge forming part of the circuit of FIG. 3, FIG. 5 is a circuit diagram of the amplifier and servomotor which is shown diagrammatically in FIG. 3, FIG. 6 illustrates diagrammatically an electric current to pressure convertor which forms a part of the control circuit of FIG. 3, FIG. 7 is a section through penumatic positioning apparatus, shown diagrammatically which is connected to the probe which contacts the surface of the molten glass, FIG. 8 illustrates the application of the invention in the vertical drawing of sheet glass, and FIG. 9 is a view similar to FIG. 2 of a modified apparatus employing two electrical probes.

In the drawings like references designate the same or similar parts.

Referring to FIG. 1 of the drawings, a glass melting furnace, shown diagrammatically, comprises a floor 1, side walls 2, a roof 3, and end walls 4 and 5.

The glass melting furnace is of conventional kind, having an inlet shelf 6 from which batch material 7 is fed on to the surface 8 of the melt 9 in the furnace.

The rate of feed of the batch material 7 on to the surface of the molten glass is controlled by a feeding roller 10 mounted in a pit 11 just outside an inlet 12 to the furnace formed in the inlet end wall 4. There are axially-extending vanes 13 on the surface of the feed roller 10, which extends across the whole width of the inlet 12, and the batch material 7 is impelled forwardly through the inlet 12 when the roller is rotated.

The speed of rotation of the roller 10 controls the rate of feed of batch material on the molten surface 8. The roller is driven by chain drives 14 extending between sprockets 15 fixed to stub shafts, not shown, on the ends of the roller 10 outside the ends of the furnace. The stub shafts extend through glands in the side wals of the pit 11.

The other end of the chain drives 14 extend around sprockets 16 fixed to the output shaft 17 of a variable speed gear box 18 whose input shaft 19 is driven by an electric motor 20. The output speed of the gear box 18 is adjusted through a linkage 21, 22 which is connected through a turnbuckle 23 to a piston rod 24 fixed to a piston 25 which is slidable in a cylinder 26. The piston 25 and cylinder 26 constitute a double-acting piston and cylinder system and there are two air pressure lines 27 and 28 connected to inlet ports in the ends of the cylinder 26 in well-known manner.

A spool valve 29 of known kind controls the movement of the piston 25 in the cylinder 26, the valve 29 being supplied with air under pressure, e.g. 40 p.s.i., on a supply line 30. The valve 29 controls the supply of this high pressure air to one side and/or the other of the cylinder, the movement of the spool in the valve being under control of the pressure on an air line 31 and the movement of an L-shaped link 32 fixed to the turnbuckle 23, which link 32 acts as a feedback from the control input of the gear box 18 to the control valve 29.

The air line 31 is connected to the output from a pneumatic recorder and controller 33 of well-known kind which receives an input on a further air line 34 the derivation of which is described below and which represents the actual surface level of a body of molten glass.

Near the outlet end of the furnace there is a skim bar 35 and downstream of the skim bar 35 there is a skimming pocket 36 formed in one of the furnace side walls 2. The pocket 36 is shown in greater detai in FIG. 2, and glass level indicating apparatus according to the invention is mounted in the pocket 36. An outlet 37 through the outlet end wall 5 of the furnace permits the flow of molten glass 38 from the furnace along a canal defined by a floor 39 and side walls 40.

In order to maintain the flow of molten glass 38 along the canal 39, 40 constant or substantially so, it is necessary to maintain the level 41 of the molten glass 38 downstream of the skim bar 35 constant or substantially so. This is done according to the invention by producing a continuous indication of the surface level 41 of the molten glass 38 and automatically controlling the rate of feed of batch materials 7 through the inlet 12 to the furnace.

Referring to FIGURE 2, the roof 42 of the skimming pocket 36 is formed with a hole 43 through which extends an electrical probe 44 which is preferably a carbon rod. The probe is held at its upper end in a mounting 45 which is fixed to the under surface of a cross-piece 46 of electrically insulating material.

The upper surface of the cross-piece 46 is fixed to the end of two limbs 47 and 48 of a bridge member straddling the cross-piece 46. The centre bar 49 of the bridge member is fixed to the lower end of a movable shaft 50 which extends downwardly from a pneumatic positioning apparatus 51 of known kind which is described in greater detail with reference to FIG. 7.

The pneumatic positioning apparatus 51 is contained in a water-cooled jacket 52 and is fixed to a bracket 53 carried by a sliding nut 54 located on a lead screw 55 mounted between two fixed bearing plates 56. There is a knurled knob 57 on top of the lead screw 55 to permit manual setting of the position of the probe 44 relative to the surface 41 of the molten glass 38.

On top of the cross piece 46 there is an electrical terminal 58 which is in electrical contact with the probe 44.

The lower end of the probe 44 is rounded, and has fixed thereto a tip 59 in the form of a small cylindrical slug of platinum or a platinum/rhodium alloy.

A fixed electrode in the form of a rod 60 of platinum dips into the molted glass 38 in the pocket 36. The rod 60 extends downwardly through the surface of the molten glass, being held near its upper end by a connector bar 61 which passes through the end wall 62 of the pocket and carries a terminal 63 on the outer surface of the end wall 62.

A bead 64 of molten glass is drawn on the tip 59 of the probe 44 from the surface 41 of the molten glass 38. This bead 64 is usually about 1/16" to 1/8" high. The distance from the electrode 60 to the drawn bead 64 is about 2–3 feet, and changes in the surface level of the molten glass are indicated by changes in the value of the series resistance of the bead 64 of molten glass, the molten glass between the bead and the electrode 60.

The temperature of the molten glass 38 in the pocket 36 is, for example, about 1200° C. and the electrical resistance between the probe 44 and the electrode 60 is determined by the size and shape of the bead of glass 64 which is drawn upwardly on the tip 59 of the probe. The hotter the glass, the less viscous it is and so the bead will be thinner and therefore have a higher resistance. Because electrical conductivity decreases with temperature, there is some compensation for the change in dimensions of the bead, and so for a given position of the probe relative to the surface 41 of the glass the resistance between the probe 44 and the electrode 60 is substantially constant over a range of temperature change, for example ±25° C.

The servo loop which controls the pneumatic positioner 51 is initially set as described below so that the bead of molten glass 64 is of a certain optimum height and the resistance between the probe 44 and the electrode 60 has a corresponding optimum value.

When the surface level 41 of the molten glass changes there is a change in the height of the bead 64. If the surface level 41 rises the bead decreases in height and the electrical resistance between the probe and the electrode falls. If the surface level 41 falls the bead becomes elongated with a corresponding increase in the electrical resistance between the probe and the electrode.

According to the invention such changes of electrical resistance are employed in a closed loop servo-control circuit which moves the positioner 51 in such a way that the tip 59 of the probe 44 is maintained at a constant height above the surface level 41 of the bath. If the surface level 41 changes there is a compensating movement of the probe by the positioner 51 either up or down until the bead 64 is returned to its optimum height, and by monitoring the pneumatic signal controlling the positioner 51 there can be obtained and recorded a continuous indication of the surface level 8 of the molten glass in the furnace.

The pneumatic signal controlling the positioner 51 in the manner to be described below also provides an indication of the actual surface level of the molten glass with reference to a datum surface level which is set by adjustment of the lead screw 55, and can be employed to control the speed of the batch feeding roller 10 so as to regulate the rate of feed of batch materials 7 to the furnace in order to maintain the surface level 41 of the molten glass 38 constant at the datum level.

Changes in the electrical resistance between the probe 44 and the electrode 60 are detected by a bridge circuit 65, see FIGS. 3 and 4, which is connected by leads 66 and 67 to the terminal 58 on top of the cross piece 46, and to the terminal 63 of the electrode 60. The output from the bridge circuit 65 is an error signal indicating a movement of the surface level 8 of the glass relative to the probe 44, and this error signal on lead 68, FIG. 3, is amplified by an amplifier 69, described below in detail with reference to FIG. 5. The output from the amplifier 69 is on lead 70 and is fed to a split phase A.C. servomotor 71 whose output shaft is mechanically coupled, as indicated at 72, to a wiper 73 of a potentiometer 74 which is energised from a stabilised constant voltage supply 75.

The wiper 73 of the potentiometer 74 is connected by a lead 76 to an electrical current to pressure convertor 77 which will be described below in greater detail with reference to FIG. 6. This convertor 77 has a pressure input of, for example, 20 p.s.i. on a line 78 and the output on pressure line 79 from the convertor 77 varies between 3 and 15 p.s.i. depending on the variation of the D.C. current fed to the convertor on lead 76, which current variation may be, for example, within the range 1 to 5 milliamps.

The line 79 is connected to one input of the power positioner 51, which also has a supply input on pressure line 80, for example at a pressure of 40 p.s.i. The pressure line 79 is connected to the recorder 33 by the line 34, and the recorder 33 produces a continuous trace indicating the pressure on the line 79. Changes in the pressure on the line 79 are proportional to changes in the electrical resistance between the probe 44 and the electrode 60, so that the recorder produces a continuous indication of the surface level 41 of the molten glass.

The steady pressure on the line 79 is employed to give an indication of the height of the surface 41 relative to the datum surface level set by adjustment of the nut 54 on the lead screw 55, FIG. 2. A change in pressure on line 79, which is transmitted along the line as a pressure signal causes the pneumatic positioner 51, through the shaft 50, to move the probe 44 so that it follows changes in the surface level 41 of the molten glass and restore the electrical resistance between the probe 44 and the electrode 60 to its optimum value. Thus, if the glass level falls the electrical resistance increases and the positioner 51 receives a pneumatic signal causing it to depress the shaft 50 and therefore move the tip 59 of the probe back towards its optimum height above the surface level 41 of the glass. That is by operation of the servo-loop movement of the probe 44 follows the movement of the surface 41 either up or down.

The bridge 65 is illustrated in greater detail in FIG. 4. The two leads 66 and 67 are connected to one arm of the bridge and an adjacent arm of the bridge comprises a fixed resistor 81 and a variable resistor 82. The other two arms of the bridge consist of resistors 83 and 84 of equal value. The bridge is supplied from an A.C. supply 85 through a transformer 86 whose secondary winding is connected across one diagonal of the bridge, and the output from the opposite diagonal of the bridge is taken on leads 87 and 88.

The resistor 82 is adjusted initially so that the bridge is balanced when the tip 59 of the probe 44 is an optimum height above the surface level 41 of the molten glass, for example drawing a bead of about 3/32″ height. This initial balance of the bridge sets the optimum bead height and the corresponding optimum resistance of the bridge arm to which the leads 66 and 67 are connected. If, following this initial setting the surface level of the glass changes, the bridge becomes unbalanced and an output appears between leads 87 and 88. The phase of this output will depend on whether the surface level of the glass is rising or falling.

Referring to FIG. 5, which is the circuit diagram of the amplifier 69 and servo-motor 71, the output leads 87 and 88 from the bridge of FIG. 4 are connected to the primary winding 89 of an input transformer 90 of the amplifier 69. The secondary winding 91 of the transformer 90 is connected to the input of a first stage 92 of a four-stage triode amplifier consisting of additional amplifier stages 93, 94 and 95. The anode of each stage of the amplifier is connected to the grid of the next stage through a resistor/capacitor coupling. That is, the anode of stage 92 is connected by capacitor 96 and resistor 97 to the grid of stage 93 whose anode is connected by a capacitor 98 and a variable resistor 99 to the grid of stage 94. The variable resistor 99 permits adjustment of the gain of the amplifier in order to stabilise the servo-loop. The stage 94 is connected by capacitor 100 and resistor 101 to the grid of stage 95 and the output from the anode of this final stage 95 of the amplifier is connected to the input circuit indicated at 102 of a power output pentode 103, whose anode is choke/capacity coupled by a choke 104 and capacitor 105 to suppress surges on the output. A transistor amplifier may be employed in place of the valve amplifier just described.

The output from the pentode 103, which is the amplified error signal, is coupled through a capacitor 106 to the series connected motor signal windings 107 and 108 of the two phase servo-motor 71. The series connected windings 107 and 108 are tuned by a capacitor 109 to increase the efficiency of the output and the reference phase winding of the motor 71 is indicated at 110. The output shaft of the motor, which is not shown, is mechanically connected as indicated at 72 to the wiper 73 on the potentiometer 74, and the output from the potentiometer 74 is taken on two leads 111 and 112 which are connected to an actuating coil in the current to pressure convertor 77. As the wiper 73 is moved by the motor 71 the current on the lead 111 varies between 1 and 5 milliamps. Depending on the phase of the error signal from the bridge 65 so the motor 48 moves the wiper 50 to one side or the other of its position corresponding to the optimum height of the drawn bead, thereby increasing or decreasing the current supplied to the convertor 77 until the error signal from the bridge is eliminated.

The current to pressure convertor 77 is illustrated diagrammatically in FIG. 6 and is an electro-pneumatic transducer of known kind. The leads 111 and 112 are connected to coil 113 on the core 114 of a magnet 115. A beam 116 of magnetic material is supported beneath the magnet core 114, being pivoted at one end in brackets 117 fixed to the bottom of one leg 119 of the magnet 115. A compression spring 119 is fixed to the underside of the arm.

The other end of the beam 116 lies pust below a nozzle 120 connected to the pressure upply line 78. There is a restrictor 121 in the supply line 78.

Variation of the current supplied to the coil 113 on the lines 111 and 112 causes variation in the position of the beam 116 under the joint action of the field of the magnet and the spring 119 and so the free end of the beam 116 moves towards and away from the nozzle 120 and so varies the bleeding of air from the line 78 through the nozzle 120. This varies the pressure on a pressure line 79 which may be connected to a 1:1 volume booster of known kind, not shown, if so desired.

The value of the pressure on the output line 79 varies directly with variations in the current supplied to the coil 113 and in a practical embodiment the variation of pressure on the line 79 is from 3 to 15 p.s.i. for current variations of 1 to 5 milliamps on the input leads 111 and 112.

The line 79 is connected to the signal input to the power positioner 51 which is illustrated in greater detail in FIG. 7. The constant pressure supply line 80 is connected by a flexible connector 122 to a right-angled nozzle member 123. There is a restrictor 124 in this member 123 which terminates in an upstanding nozzle 125 directed towards a fixed surface 126. A branch pipe 127 leads away from the nozzle 125, and the pressure on this branch line is determined by the spacing of the nozzle 125 from the fixed surface 126.

In order to vary this spacing in response to changes in the pressure on line 79, the nozzle member 123 is mounted on one end of a rod 128 whose other end is fixed to the free top plate 129 of a bellows 130. The bellows has a bottom plate 131 which is fixed in a housing 132, and the pressure line 79 is fixed to a central orifice 133 in the plate 131 by a union member 134 fixed in that orifice. A spring 135 extends between a fixed seating 136 and the free top plate 129 of the bellows so that the pressure on line 79, and in the bellows 130 acts against the spring 136 to determine the position of the top plate 129 and therefore the spacing of the orifice of the nozzle 125 from the fixed surface 126.

The branch pipe 127 is joined by a flexible connection 137 to an air line 138 which terminates in a bushing 139 fixed in a central orifice 140 in a top plate 141 of a bellows 142. The top plate 141 is held in a fixed housing 143.

A movable bottom plate 144 closes off the bottom of the bellows and the top end of the output shaft 50 of the positioner is threaded and is held by lock nuts 145 in a central hole through the bottom plate 144. A compression spring 146 extends between the bottom plate 144 and a fixed seating 147 which forms a part of the casing of the positioner 51.

The steady pressure on line 79 indicates the actual position of the surface 41 of the body of molten glass and any change in that pressure due to an error signal from the bridge 65 is converted into a pneumatic signal on the line 79, which signal causes the bellows 130 to move the nozzle 125 so that it is amplified into a greater pressure change on the line 127. This pressure change on line 127 causes movement of the bottom plate 144 of the bellows 142, thereby extending or retracting the shaft 50, until the bead 64 of molten glass is restored to its optimum height and the bridge is balanced once again.

In this new balanced condition of the apparatus the steady position of the probe 44 has changed and there is a steady direct current output from the potentiometer 74 on lines 111 and 112 which indicates this new position of the probe at its optimum height above the surface 41 of the molten glass. This current is transformed into a pressure on line 79 which pressure is transmitted to the controller 33 on line 34 and actuates the controller to produce a visible record of the surface level of the molten glass.

The required datum level of the molten glass is set into the controller 33 and the actual surface level, indicated by the pressure on line 34, is compared in the controller 34 with the datum value and a pneumatic signal output on line 31 from the controller regulates the rate of feed of batch material through the inlet to the glass melting furnace, as shown in FIGURE 1. There is a built in delay in the controller to account for the lapse of time between a change in the rate of feed of batch materials to the furnace, and a change in the surface level 41 of the molten glass 38 tending to restore the surface level 41 to the required datum level.

In this way the level of the surface 41 of the molten glass at the outlet end of the furnace is maintained constant or substantially so that there is a constant head of molten glass supplying the feed through the canal 39, 40.

If desired the probe 44 and electrode 60 may be located in a pocket in the side wall of a canal leading from the furnace. One such pocket is indicated by dotted lines at 148 in FIGURE 1.

The invention may also be applied in other locations in glass manufacturing processes, for example in the vertical drawing of sheet glass which is drawn vertically from the surface of a body of molten glass contained in a drawing pot.

As illustrated diagrammatically in FIGURE 8 a pocket 149 is formed in one end wall of a drawing chamber 150 through which sheet glass 151 is continuously drawn from the surface 152 of a body 153 of molten glass contained in a drawing pot 154. Molten glass 155 is supplied to the drawing pot 154 through a canal indicated generally by the reference 156. This canal has a roof structure 157 extending up to a shut-off block 158 and a vertically adjustable tweel 159 is suspended by hangers 160 through a slot-shaped aperture 161 in the roof structure 157.

The hangers 160 are connected to a height regulator 162 which is operable in response to a difference signal on the pressure line 31 from the controller 33 to raise or lower the tweel 159 which holds back a small head of molten glass in the canal as indicated at 163.

The probe 44 is mounted in the pocket 149 in the manner illustrated in FIGURE 2, and there is also a fixed electrode 60 dipping into the molten glass in the pocket. The probe 44 and the electrode 60 are connected into the servo-loop illustrated in FIGURES 3 to 7 and the height regulator 162 operates when the level of the surface 152 of the molten glass in the drawing pot differs from a datum valve to adjust the height of the tweel 159 so as to regulate the rate of flow of molten glass to the drawing pot thereby to maintain the surface level 152 of the body of molten glass in the drawing pot constant or substantially so.

Another application of the invention is in the manufacture of glass fibres. Normally a body of molten glass is maintained over a series of bushings from which the glass fibres are drawn. The molten glass may be contained in a pressurised chamber fed with molten glass through a submerged doghole in a melting furnace and a probe according to the invention mounted in the chamber so as to draw a bead from the surface of the body of molten glass. The pressure in the chamber is modified in response to changes in the surface level of the molten glass so as to maintain a constant effective head of pressure above the bushings. This is effected by employing the pneumatic signal on line 31 to control the supply of atmosphere into the chamber. Alternatively the signal on line 31 may be employed to regulate the rate of flow of molten glass through the doghole or to regulate the rate of feed of marbles of glass into the body of molten glass.

A modified arrangement according to the invention is illustrated in FIGURE 9 which shows the use of two probes 164 and 165 in place of the single probe 44 and fixed electrode 60 of FIGURE 2. The probes 164 and 165 respectively carry platinum tips 166 and 167 on their lower ends, which tips draw up beads of glass 168 and 169 from the surface 41 of the body of molten glass 38.

The shaft 50 of the pneumatic positioner 51 is directly connected to the centre of the electrically insulating cross piece 46, and the two probes are fixed to the crosspiece 46 by mountings 170 and 171. Electrical terminals 172 and 173 are fixed to the top of the crosspiece 46 and are respectively in electrical connection with the probes 164 and 165, and the lead wires 66 and 67 respectively connect the terminals 172 and 173 to the bridge 65. The resistance of the bridge arm is therefore the series resistance of the two beads 168 and 169 of molten glass and of the intervening molten glass between the beads.

It has been found that the apparatus has a resolution of one-thousandth of an inch, and a long-term stability of plus or minus 2.5 thousandths of an inch given that the temperature of the molten glass does not fluctuate outside a range of plus or minus 25° C. from the initial temperature in which the apparatus is set up. The maximum stroke of the output shaft 33 of the pneumatic positioner 34 is ½ inch so that there is room for movement of the probe or probes ¼ inch on either side of the datum position which has been set by the initial adjustment of the lead screw 55, FIGURE 1. If desired, the positioner 51 may have a longer stroke, for example 1 inch, to give greater freedom of movement of the probe or probes in conditions where greater fluctuations in the surface level of the glass are to be expected.

The invention thus provides a method and apparatus for continuously observing the surface level of a body of molten glass, and for monitoring that surface level as a continuous record of fluctuations in the level as well as controlling and maintaining the level in response to signals indicating level changes.

I claim:

1. In a glass manufacturing process, continuously controlling the surface level of a body of molten glass by drawing a bead of glass from the surface of the molten glass, maintaining the bead unbroken, measuring the resistance of an electrical circuit including that bead, detecting any change in resistance of the circuit from an optimum resistance value corresponding to an optimum height of the bead due to a change in the dimensions of the bead as the surface level of the molten glass changes from a datum level, which resistance will rise as the height of the drawn bead increases and will decrease as the height of the drawn bead decreases, producing an error signal indicative of that change of resistance, employing the error signal to return the height of the drawn bead of molten glass to said optimum height, continuously feeding the body of molten glass with glass forming materials, and monitoring said error signal to produce a difference signal indicative of the change in surface level of the molten glass from the datum level and employing said difference signal to vary the rate of feed of glass forming materials to the body of molten glass so as to maintain the surface level of the body of molten glass at said datum level.

2. A method according to claim 1, wherein two beads of glass are drawn from the surface of the molten glass and the resistance of the circuit including the two beads of glass and the intervening glass is measured.

3. Apparatus for continuously controlling the surface level of a body of molten glass, comprising an electrical probe for continuously drawing a bead of molten glass from the surface of the said body of molten glass, positioning means connected to the probe and operable to move the probe towards and away from the surface of the molten glass without breaking the bead, an electrical detection circuit connected to the probe and to the body of molten glass to measure the resistance of an electrical circuit including the drawn bead, to produce an error signal indicative of any change in the resistance of the circuit from an optimum resistance level corresponding to an optimum height of the bead caused by a change in the dimensions of the bead as the surface level of the molten glass changes from a datum level, which resistance will rise as the height of the drawn bead increases and will decrease as the height of the drawn bead decreases, signal transmitting means connecting the detection circuit to the positioning means which on receipt of an error signal returns the drawn bead to its optimum height, means for continuously feeding the body of molten glass with glass forming materials, and monitoring means connected to the signal transmitting means to monitor said error signal to produce a difference signal indicative of the change in surface level of the molten glass from the datum level and to employ said difference signal to vary the rate of feed of glass forming materials to the body of molten glass so as to maintain the surface level of the body of molten glass at said datum level.

4. Apparatus according to claim 3, wherein the electrical detection circuit includes an A.C. bridge one arm of which is connected to the probe and to the body of molten glass.

5. Apparatus according to claim 3, including a comparator device for continuously comparing the output signal from the signal transmitting means with a datum signal indicating the datum level of the surface of the body of molten glass, said comparator device with means operable to produce said difference signal indicating a fluctuation of the actual level of the glass from that datum level, and means for regulating the rate of feed of glass forming materials to the body of molten glass, which regulating means is connected to said comparator device and is operable by said difference signal to vary the rate of glass forming materials in order to correct said fluctuation thereby maintaining the surface level of the body of molten glass at said datum level.

6. In a glass manufacturing process, continuously controlling the surface level of a body of molten glass by drawing a bead of glass from the surface of molten glass, maintaining the bead unbroken, measuring the resistance of an electrical circuit including that bead, detecting any change in resistance of the circuit from an optimum resistance value corresponding to an optimum height of the bead due to a change in the dimensions of the bead as the surface level of the molten glass changes from a datum level, which resistance will rise as the height of the drawn bead increases and will decrease as the height of the drawn bead decreases, producing an error signal indicative of that change of resistance, employing the error signal to return the height of the drawn bead of molten glass to said optimum height, continuously feeding the body of molten glass with glass forming materials, continuously comparing said error signal with a datum signal indicating the datum level of the surface body of molten glass, producing from said comparison a difference signal indicating a fluctuation of the actual level of the glass from that datum level, and employing said difference signal to vary the rate of feed of glass forming materials to the body of molten glass in order to correct said fluctuation to maintain the surface level of the body of molten glass at said datum level.

7. A method according to claim 6, comprising producing an electrical error signal indicative of a change in resistance of said electrical circuit, converting said electrical error signal into a pneumatic signal, and employing the pneumatic signal to return the height of the bead or beads of molten glass to the optimum height.

8. A method according to claim 7, wherein the pressure in the pneumatic circuit through which said pneumatic signal is transmitted is indicative of the level of the surface of the glass relative to a datum level and said pressure is employed to control the rate of feed of glass to said body of molten glass so as to return the surface level to the datum level.

9. Apparatus according to claim 4, wherein the output from the bridge is connected through an amplifier to a servo-motor connected to a wiper on a potentiometer connected across a D.C. supply, whereby a change in the output from the bridge indicating a change in level of the surface of the molten glass is transformed into said error signal which appears as a change in the direct current flowing in the output circuit of the potentiometer.

10. Apparatus according to claim 9, wherein said signal transmitting means includes a current to pressure convertor whose input is connected to the output circuit of the potentiometer, and whose output is connected by a pressure line to the positioning means, said convertor being operable to convert the direct current flowing in the output circuit of the potentiometer into a corresponding pressure on the pressure line for transmission to the positioning means whereby said error signal appears as a change in pressure on the pressure line which causes the positioning means to return the probes to the optimum height above the surface of the molten glass and thereby eliminate the error signal.

References Cited
UNITED STATES PATENTS

| 2,483,333 | 9/1949 | Cannon et al. | 65—160 X |
| 3,246,124 | 4/1966 | Trethewey | 65—162 X |
| 3,305,332 | 2/1967 | Robeson et al. | 65—160 X |
| 3,348,936 | 10/1967 | Clark et al. | 65—160 X |

S. LEON BASHORE, Primary Examiner

ROBERT L. LINDSAY, Jr., Assistant Examiner

U.S. Cl. X.R.

65—160, 164, 335